July 12, 1966 A. Z. KISS 3,260,855
SWITCHING CLICK SUPPRESSOR CIRCUIT
Filed June 22, 1962
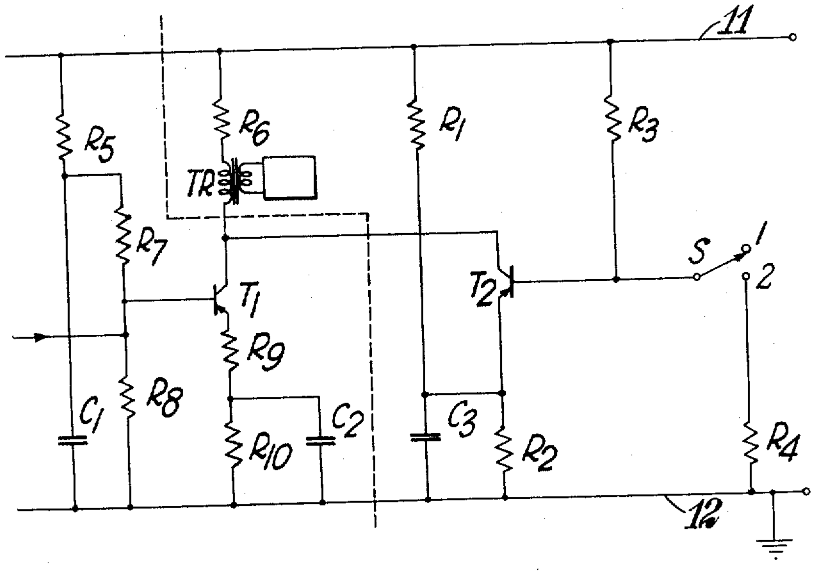
INVENTOR
AGOSTON ZOLTAN KISS
BY EUGENE J. KALIL
ATTORNEY 3,260,855

SWITCHING CLICK SUPPRESSOR CIRCUIT

Agoston Zoltan Kiss, Richmond, England, assignor to Modern Telephones (Great Britain) Limited, London, England, a British company Filed June 22, 1962, Ser. No. 204,471
Claims priority, application Great Britain, June 22, 1961, 22,697/61
3 Claims. (Cl. 307—88.5)

The invention relates to a switching means, and more particularly to a circuit including click elimination means, for switching an alternating current signal, for example an audio signal or a tone, which alternating current signal is superimposed on a direct current signal. The invention is especially useful with tone keyers.

According to one feature of the invention there is provided a tone keyer circuit for switchably controlling the output from a signal source having an alternating and a direct component, comprising a transistor having an emitter, a collector and a base; biasing means and switch means, one of the emitter and the collector being directly connected to one of the output terminals of the signal source and the other being coupled to the other output terminal through the biasing means, so that the direct component of the potential difference between the emitter and the collector is maintained at all times substantially zero, and the switch means being arranged to apply selectively first and second potentials to the base, which potentials render the transistor respectively into a conductive and a non-conductive state.

With this arrangement it is possible to provide a transistorized switch which on switching gives rise to substantially no direct voltage change in the circuit. In application to audio frequency signals, the invention may thus be used to obviate audio impulses in the output caused by such direct voltage changes. For example the output of an audio amplifier is often an alternating current signal superimposed on a direct current signal derived from the high tension supply to the last stage of the amplifier. If the combined signals are switched by the tone keyer, the direct current component produces objectionable impulses at the output of the keyer. Such audio impulses may occur in an output loudspeaker, for example, as loud clicks. The invention may however be applied to alternating signals of any suitable frequency to which the circuit components will respond.

According to a further feature of the invention there is provided a tone keyer in which a winding of a transformer, adapted to couple or transform a tone or audio signal, is connected in series circuit relationship with a transistor, switching means being provided for switching the transistor into one or the other of two conductivity states, the arrangement of the circuit being such that in one conductivity state a low alternating current impedance shunts the signal so it cannot enter said transformer winding, and in the other conductivity state a high alternating current impedance is presented to the signal so the same can enter said transformer winding, and in both said states and while switching from either state to the other there is present in series circuit relationship with said transformer winding the same or substantially the same direct current resistance.

One exemplary form of the present invention will now be described with reference to the accompanying drawing the sole figure of which is a theoretical circuit diagram embodying a tone keyer according to the invention.

The circuit is made up of the following components connected as shown:

| | |
|---|---|
| $R_1$ | 330Ω. |
| $R_2$ | 10KΩ. |

| | |
|---|---|
| $R_3$ | 150KΩ. |
| $R_4$ | 56KΩ. |
| $R_5$ | 4.7KΩ. |
| $R_6$ | 470Ω. |
| $R_7$ | 18KΩ. |
| $R_8$ | 22KΩ. |
| $R_9$ | 82Ω. |
| $R_{10}$ | 7.5KΩ. |
| $C_1$ | 25μf. |
| $C_2$ | 25μf. |
| $C_3$ | 100μf. |
| TR | Belclere BN 2082. |
| $T_1$ | Mullard OC83. |
| $T_2$ | Mullard OC83. |

A transistor $T_1$ with its associated circuit (shown to the left of the broken line) is a loudspeaker pre-amplifier having approximately 26 db amplification and is coupled via a transformer TR to a loudspeaker power amplifier, not shown. The transformer TR has a primary winding having a direct current resistance of about 100 ohms. As mentioned later, the alternating current impedance of the primary winding with the transformer on load is about 5 kilohms.

A transistor $T_2$ with its associated circuit (shown to the right of the broken line) comprises a tone keyer according to the invention. The load of transistor $T_1$ comprises in series combination a resistor $R_6$ and the primary winding of transformer TR. The collector of transistor $T_1$ is conected directly to the collector of transistor $T_2$ and the emitter of transistor $T_2$ is connected to the junction of resistors $R_1$ and $R_2$ which constitute a potential divider connected between the negative potential supply line 11 of the circuit and ground or earth. With the component values set forth above the supply potential on line 11 is conveniently —24 volts with respect to the earth line 12. Resistor $R_2$ is by-passed to earth with respect to alternating current by a capacitor $C_3$. The values of resistors $R_1$ and $R_2$ are chosen so that the potential on the emitter of transistor $T_2$ is substantially the same as the potential on the collector thereof, this latter potential being governed by the standing direct potential on the collector of transsistor $T_1$.

Connected to the base of transistor $T_2$ is a switch S having two alternative positions shown at 1 and 2. With the switch S in position 1 the base is connected through a resistor $R_3$ to the line 11. However, with the switch S in position 2 the base of transistor $T_2$ is connected to the junction of resistors $R_3$ and $R_4$ which then constitute a potential divider. The potential on the base of transistor $T_2$ is thus raised by operation of the switch from position 1 to position 2.

When switch S is in position 1, the base current of transistor $T_2$ flowing through $R_3$ drives $T_2$ heavily into saturation, thereby presenting on its collector an alternating current impedance of 20–40 ohms. This low impedance shunts the tone or audio signal on the collector of transistor $T_1$ to earth via $T_2$ and $C_3$. When switch S is in position 2, transistor $T_2$ is cut-off, presenting a virtually open circuit to alternating currents, the tone of audio signal on the collector of $T_1$ being shunted only by the thermal current of $T_2$, thus providing a very high shunt impedance which is in the order of a few megohms. It will be seen that the resistance between the collector of $T_1$ and earth via $T_2$ to the standing direct potential on the collector of transistor $T_2$ remains the same in both positions of switch S and during switching from one position to the other. It may be helpful to observe that the circuit forms a bridge for direct current but not for alternating current. Since it is a bridge, changes in the condition of the transistor $T_2$, across which there is effectively zero direct potential, do not effect the direct current conditions of the circuit, and thus the presence of switching clicks or pedestals in the output is avoided.

To estimate the attenuation introduced by the tone keyer circuit, the load impedance of $T_1$ can be taken as 5KΩ and the shunting impedance of the transistor $T_2$ in the saturated condition as 50Ω, then the attenuation (A) when switch S is in position 1 given by $$A=20 \log \frac{5.10^3}{50}=40db$$

The fast switching of the tone keyer can be used to its full advantage if switch S is an electronic switch, for example, a Schmitt trigger circuit, or similar circuit.

While the foregoing description sets forth the principles of the invention in connection with specific apparatus, it is to be understood that the description is made only by way of example and not as a limitation of the scope of the invention as set forth in the objects thereof and in the accompanying claims.

I claim:

1. A tone keyer for controlling a signal source potential having an alternating and a direct component, comprising
   - a first transistor having emitter, collector and base electrodes,
   - said signal source being applied to the input of said transistor,
   - a load connected to the output of said transistor,
   - said emitter electrode being coupled to a common conductor,
   - a second transistor having emitter, collector, and base electrodes,
   - a capacitor for providing a shunt path to said alternating component, said capacitor being connected between said emitter electrode of said second transistor and said common conductor,
   - said collector electrode of said second transistor being connected to said collector electrode of said first transistor,
   - biasing means for said second transistor,
   - switch means arranged to apply selectively first and second biasing potentials from said biasing means to said base electrode of said second transistor, to render the same respectively into a conductive and a non-conductive state,
   - said transistor when in said conductive state forming a series circuit with said capacitor for short-circuiting said alternating component,
   - said transistor when in said non-conductive state preventing any significant attenuation of said alternating component at the collector electrode of said first transistor,
   - and the direct component of the potential difference between said emitter and collector electrodes of said second transistor being maintained substantially zero at all times, whereby the production of switching clicks at the collector electrode of said first transistor is eliminated.

2. The invention described in claim 1 wherein said biasing means comprises a pair of resistances connected between an operating potential source.

3. A tone keyer for switchably controlling the potential across a pair of terminals of a signal source which potential has an alternating and a direct component comprising
   - a first transistor,
   - a load connected in the output circuit of said transistor in series with one output electrode thereof,
   - a second transistor having an emitter electrode, a collector electrode and a base electrode,
   - said second transistor being connected across the output of said first transistor with said collector electrode coupled to said one output electrode,
   - a shunt capacitor connected between said emitter electrode and the outer output electrode,
   - biasing means for said second transistor,
   - switch means arranged to apply selectively first and second biasing potentials to said base electrode, to render said second transistor respectively into a conductive and a non-conductive state,
   - said transistor when in said conductive state forming a series circuit with said capacitor for short circuiting said alternating component,
   - said second transistor when in said non-conductive state preventing any significant attenuation of said alternating component in said output circuit,
   - and the direct component of the potential difference between said emitter and collector electrode being maintained substantially zero at all times, whereby the production of switching clicks in said output circuit is suppressed.

References Cited by the Examiner

UNITED STATES PATENTS

| | | | |
|---|---|---|---|
| 1,989,394 | 1/1935 | Aull | 328—208 |
| 2,443,195 | 6/1948 | Pensyl | 328—99 |
| 2,935,623 | 5/1960 | Overbeek et al. | 307—88.5 |
| 2,970,227 | 1/1961 | Horton et al. | 307—88.5 |
| 2,982,868 | 5/1961 | Emile | 307—88.5 |

ARTHUR GAUSS, *Primary Examiner.*

B. P. DAVIS, *Assistant Examiner.*